United States Patent [19]

Chambers

[11] Patent Number: 4,826,199
[45] Date of Patent: May 2, 1989

[54] FIFTH WHEEL HITCH

[75] Inventor: James W. Chambers, Rockford, Ill.

[73] Assignee: Atwood Industries, Inc., Rockford, Ill.

[21] Appl. No.: 173,822

[22] Filed: Mar. 28, 1988

[51] Int. Cl.⁴ ............................................. B62D 53/06
[52] U.S. Cl. .................................................. 280/434
[58] Field of Search ................ 280/434, 433, 510, 508

[56] References Cited

U.S. PATENT DOCUMENTS 3,600,006  8/1971  Slaven .................................. 280/434
3,912,301  10/1975  Ferris .................................. 280/434

OTHER PUBLICATIONS

Atwood Mobile Products Brochure MPD 70800 entitled *5th Wheel Hitch Installation Operation and Maintenance Instructions* and dated Jul. 1986.

*Primary Examiner*—David M. Mitchell
*Assistant Examiner*—Richard Camby
*Attorney, Agent, or Firm*—Leydig, Voit & Mayer

[57] ABSTRACT

A hitch adapted to be installed in the bed of a pickup truck and adapted to interlock with the kingpin of a fifth wheel trailer in order to couple the trailer to the truck. The hitch includes a pivoted latching plate for securing the kingpin, a reciprocating locking bolt for holding the latch in a latched position and a pivoted detent link for holding the locking bolt in an unlocked position when the trailer is uncoupled from the truck. When the trailer is subsequently re-coupled to the truck, the latch automatically trips the detent link to allow the locking bolt to shift automatically to a locked position holding the latch in a latched position.

7 Claims, 3 Drawing Sheets

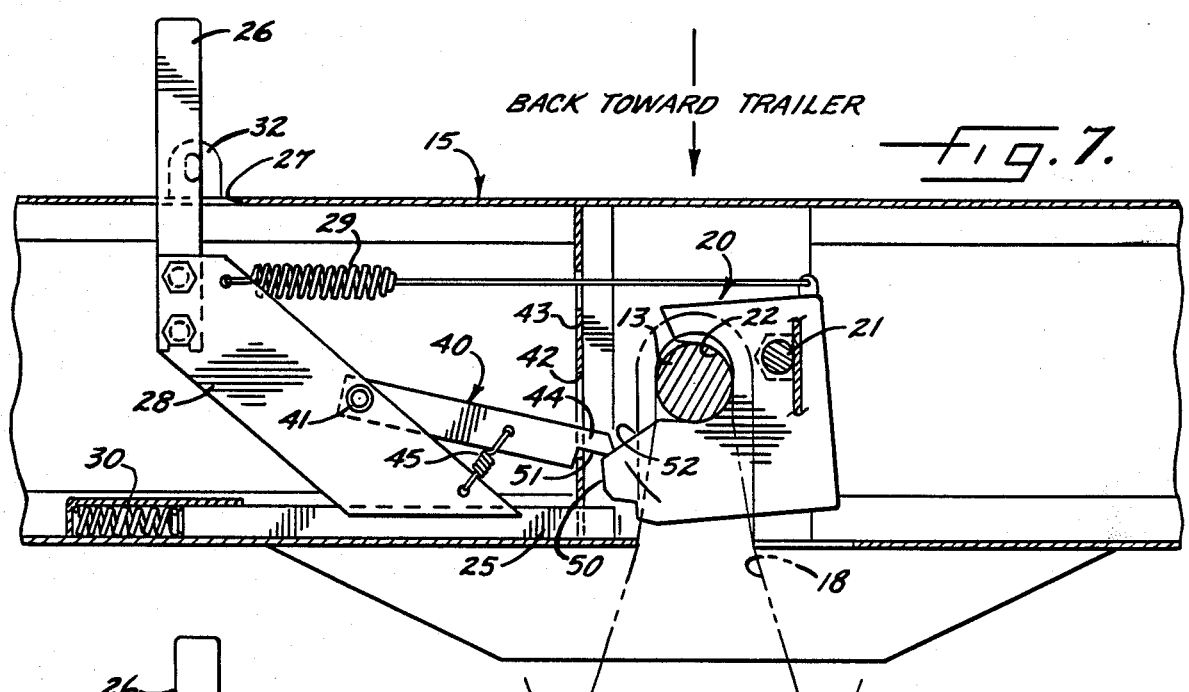
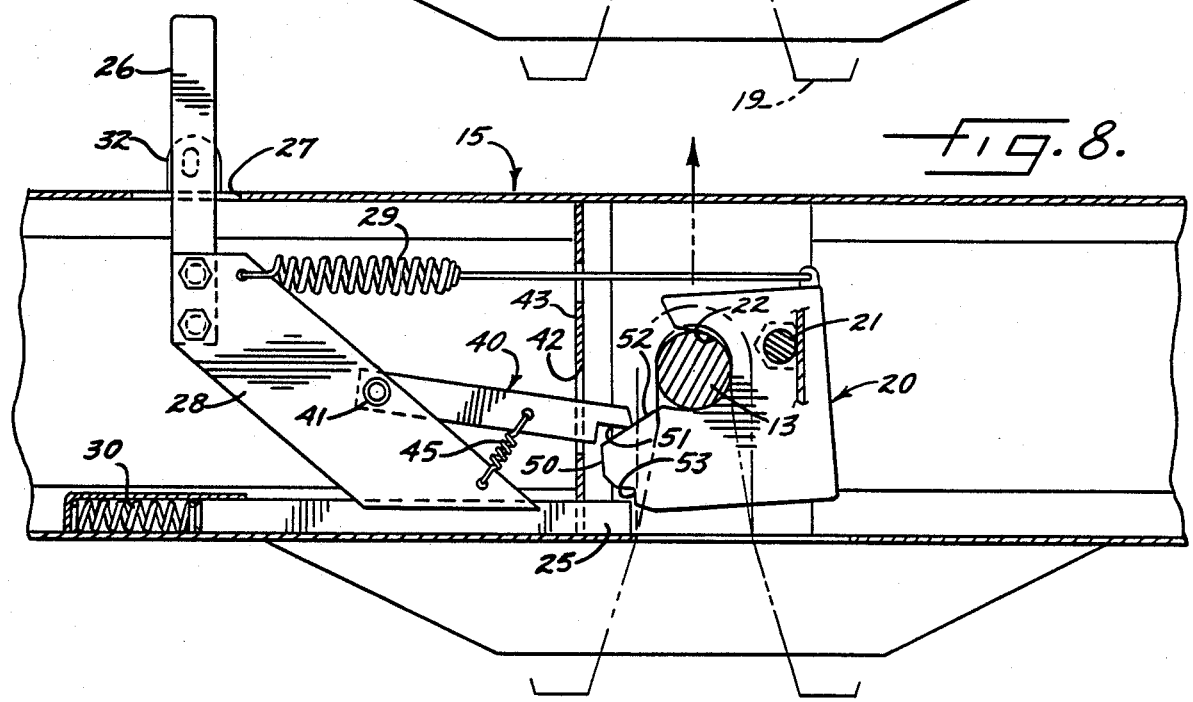

FIFTH WHEEL HITCH

BACKGROUND OF THE INVENTION

This invention relates to a hitch and, more particularly, to a hitch of the type which is adapted to be mounted in the bed of a pickup truck and is adapted to interlock with the kingpin of a fifth wheel trailer in order to couple the trailer to the truck.

The assignee of the present invention has made and sold fifth wheel hitches for several years. A typical hitch includes a main support or crossbar adapted to be mounted in the bed of the truck and formed with a rearwardly opening throat for receiving the kingpin. A latch is pivotally supported on the crossbar and is adapted to turn between latched and unlatched positions. When the latch is in its latched position, it captivates the kingpin in the throat to couple the trailer to the truck. When pivoted to its unlatched position, the latch releases the kingpin and permits uncoupling of the trailer.

The hitch further includes a locking member in the form of an elongated bolt which is adapted to be reciprocated between locked and unlocked positions. When locked, the bolt engages the latch and prevents the latch from turning to its unlatched position. The locking bolt is adapted to be shifted manually to an unlocked position by an operating handle and, when so shifted, releases the latch and frees the latch to pivot to its unlatched position.

Spring means urge the latch toward its unlatched position and urge the locking bolt toward its locked position. In the assignee's prior hitches, it is necessary to place the operating handle in a detent position after the bolt has been unlocked so as to hold the bolt in the unlocked position against the urging of the spring means and thereby permit uncoupling and recoupling of the trailer. After the trailer has been re-coupled, the operating handle must be released manually from its detent position to enable the locking bolt to move to its locked position and secure the latch.

With such prior hitches, the operators have on occasion neglected to release the operating handle of the locking bolt from its detent position after the kingpin has been coupled to the hitch and the latch has pivoted to its latched position. Under such circumstances, the locking bolt remains in its unlocked position and the latch is left free to turn to its unlatched position. If the truck is pulled forwardly under such conditions, the latch automatically unlatches to leave the trailer behind and, in some cases, the kingpin hits and damages the tailgate of the truck.

SUMMARY OF THE INVENTION

The general aim of the present invention is to provide a new and improved fifth wheel hitch of the foregoing type in which the operating handle of the locking bolt is automatically set in a detent position when the locking bolt is unlocked and then is automatically released from the detent position by the latch when the trailer is re-coupled to the hitch and the latch is turned to its latched position. As a result of automatic release of the operating handle, there is reduced danger of the trailer being towed without the locking bolt being in its locked position.

A more detailed object of the invention is to achieve the foregoing through the provision of a pivoted detent link which automatically holds the operating handle and the locking bolt in their detent and unlocked positions, respectively, during and after uncoupling of the trailer. As the trailer is recoupled to the hitch, the detent link automatically releases the operating handle and the locking bolt and enables the locking bolt to return to a locked position to hold the latch in a latched position.

The invention also resides in the relatively simple construction of the detent link and in the unique coaction between the detent link, the locking bolt and the latch.

These and other objects and advantages of the invention will become more apparent from the following detailed description when taken in conjunction with the accompanying drawings.

BRIEF DESCRIPTION OF THE DRAWINGS

FIG. 7 is still another view similar to FIG. 4 but shows the trailer being re-coupled to the hitch.

FIG. 8 is yet another view similar to FIG. 4, but shows the trailer just before it is recoupled to the hitch.

DETAILED DESCRIPTION OF THE PREFERRED EMBODIMENT

Figure 1:
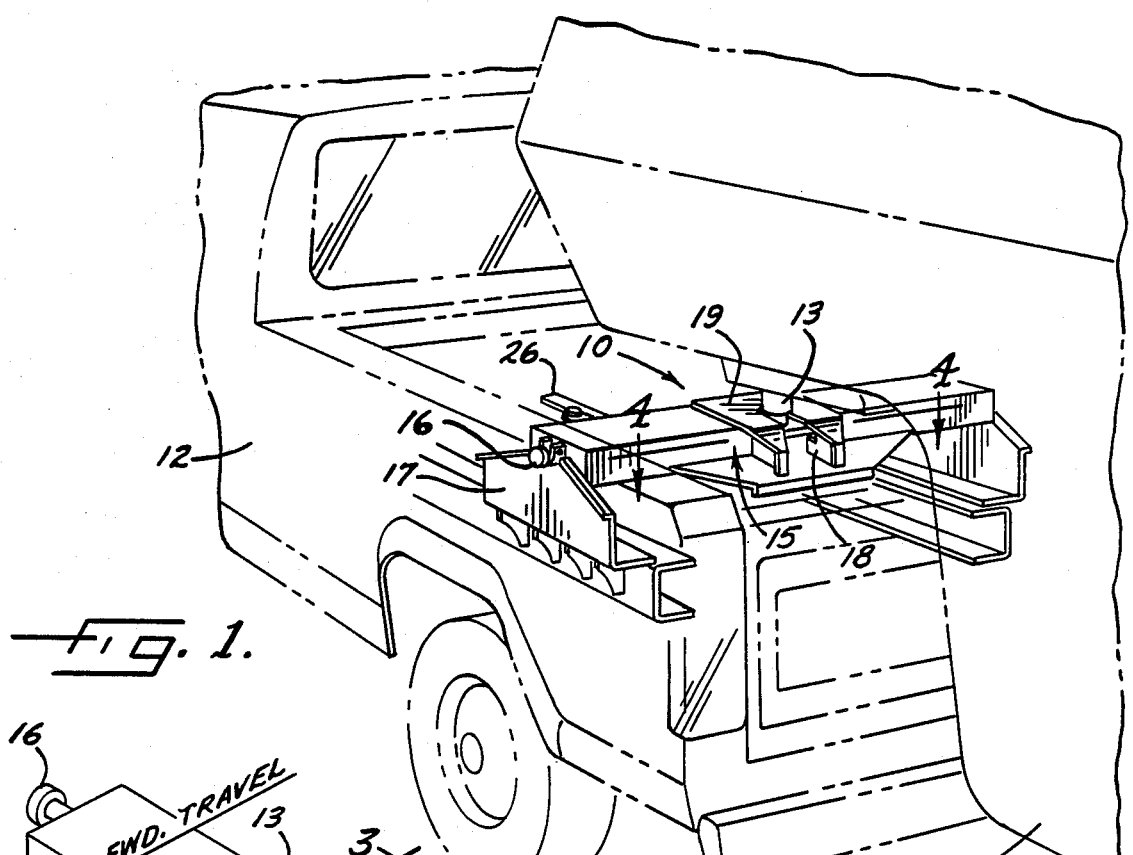
FIG. 1 is a fragmentary perspective view of a pickup truck equipped with a new and improved fifth wheel hitch incorporating the unique features.

For purposes of illustration, the invention has been shown in the drawings as embodied in a fifth wheel hitch 10 for coupling a trailing vehicle such as a recreational trailer 11 to a towing vehicle such as a pickup truck 12. The hitch is adapted to be mounted in the rear portion of the bed of the truck and extends transversely of the truck. The forward end portion of the trailer is equipped with a downwardly projecting kingpin 13.

More particularly, the hitch 10 includes a transversely extending main support in the form of a box-like crossbar 15 which is fabricated from appropriately welded sheet metal plates. Rods 16 project transversely from the ends of the crossbar and are adapted to be received by mounting brackets 17 which are anchored to the truck 12.

Formed in the crossbar 15 is an upwardly and rearwardly opening throat 18 which is adapted to receive the kingpin 13 of the trailer 11. A reinforcing plate 19 is welded to the upper side of the crossbar and is formed with a rearwardly flared notch which helps define the throat. When the truck 12 is backed toward the trailer 11, the throat 18 moves into embracing relation with the kingpin 13. During uncoupling of the trailer, the truck is driven forwardly to pull the throat away from the kingpin.

Figure 3:
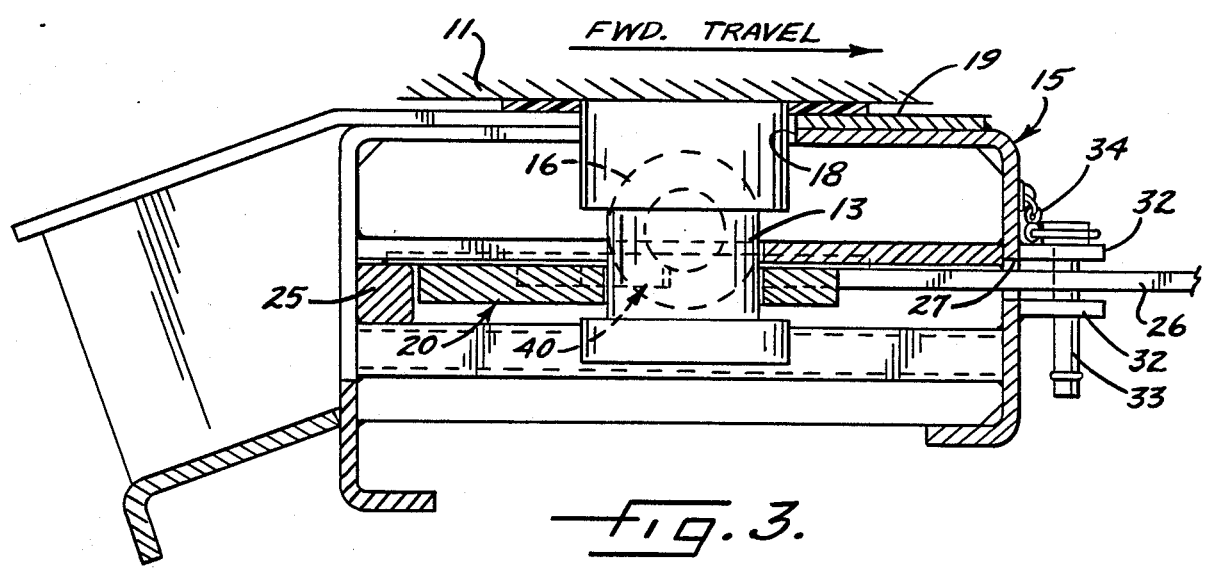
FIG. 3 is an enlarged fragmentary cross-section taken substantially along the line 3—3 of FIG. 2.

When the trailer 11 is coupled to the hitch 10, the kingpin 13 is locked securely in the throat 18 by a latch 20. As shown most clearly in FIGS. 3 and 4, the latch comprises a flat plate housed within the crossbar 15 and supported by an upright pivot 21 (FIG. 4) to turn between latched and unlatched positions. A generally C-shaped notch 22 is formed in one edge portion of the latch and, when the latch is in its latched position shown in FIG. 4, the notch faces transversely and its edges embrace the kingpin 13 to hold the latter in the throat 18. When the latch 20 is turned counterclockwise about the pivot 21 to its unlatched position shown in FIG. 6, the notch 22 faces rearwardly and its edges move out of embracing relation with the kingpin so as to enable the truck 12 to pull forwardly without towing the trailer 11.

The latch 20 is adapted to be held releasably in its latched position by a locking member 25 (FIG. 4) which herein is in the form of an elongated lock bolt. The lock bolt 25 is supported within the crossbar 15 to reciprocate between a locked position (FIG. 4) and an unlocked position (FIG. 5). Movement of the bolt from its locked position to its unlocked position may be effected by manually shifting an elongated operating handle 26 which projects forwardly through an elongated slot 27 formed in the forward side of the cross bar 15. A plate-like bar 28 (FIG. 4) is connected rigidly between the handle 26 and the bolt 25 in order to transmit motion of the handle to the bolt.

Figure 2:
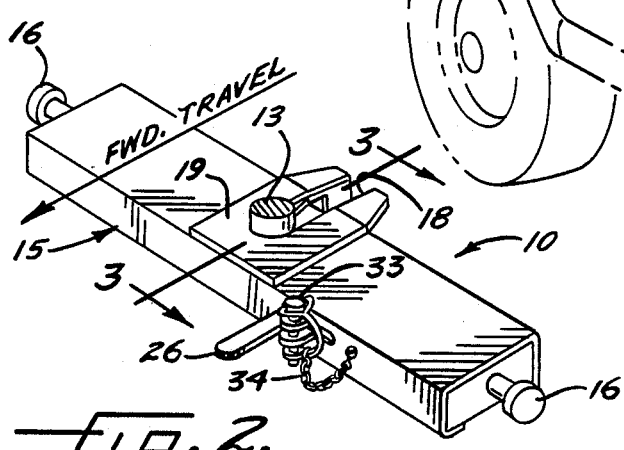
FIG. 2 is a perspective view of the hitch.
Figure 4:
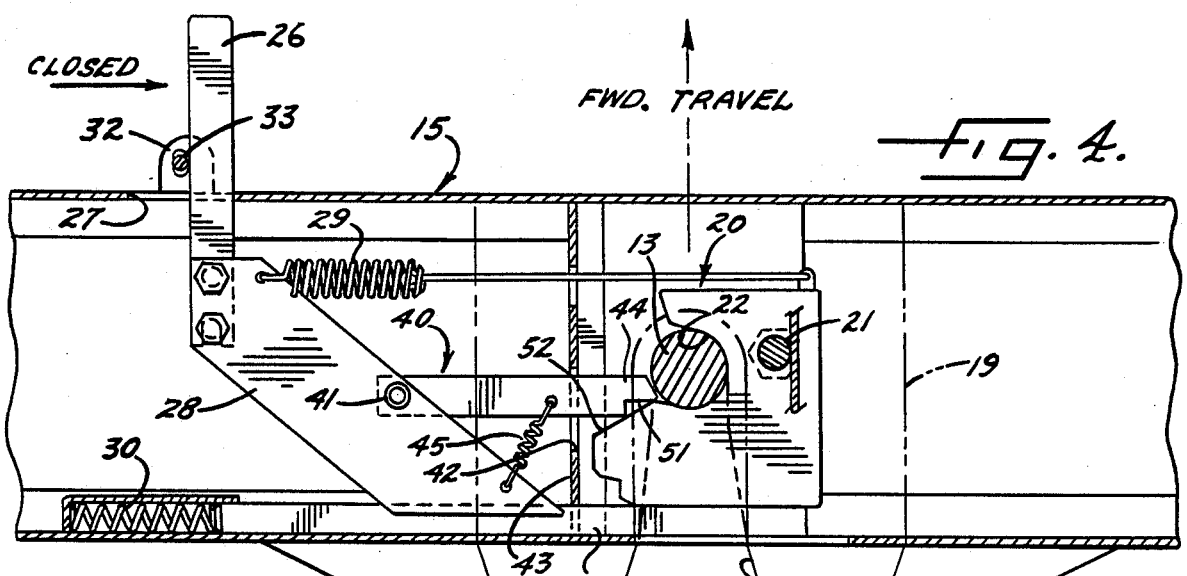
FIG. 4 is an enlarged fragmentary cross-section taken substantially along the line 4—4 of FIG. 1 and shows the latch of the hitch in a fully latched position.
Figure 5:
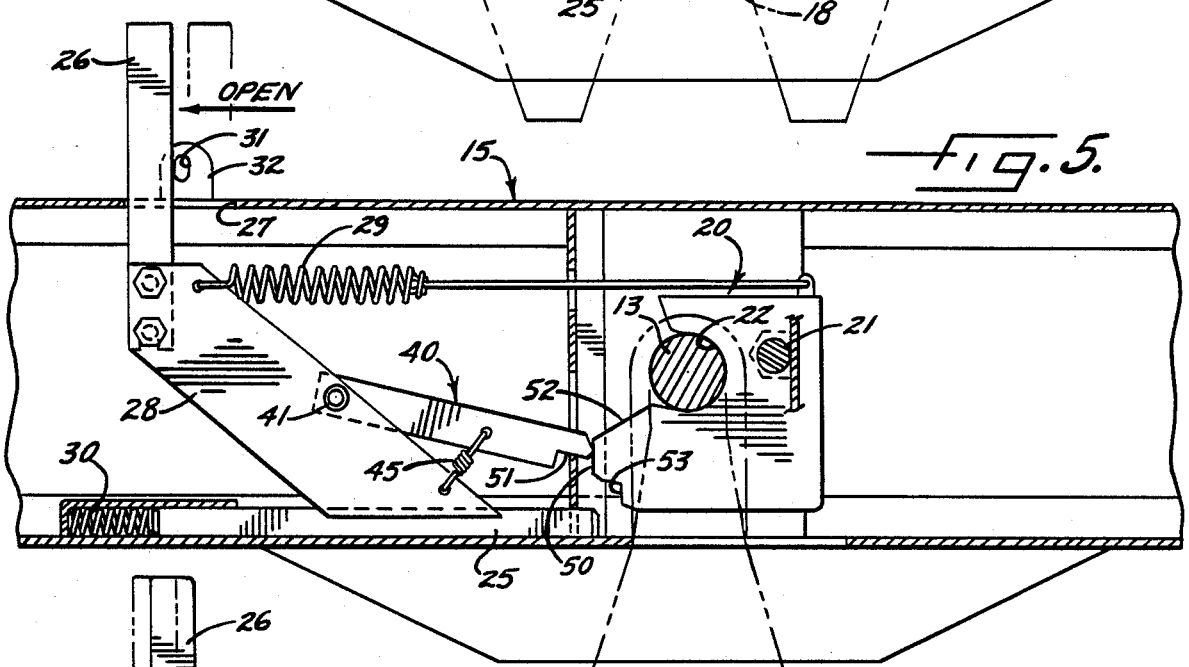
FIG. 5 is a view similar to FIG. 4 but shows the locking bolt in an unlocked position preparatory to the latch being unlatched and the trailer being uncoupled from the hitch.

A contractile spring 29 is stretched between the latch 20 and the bar 28 and urges the latch to swing counterclockwise about the pivot 21 to its unlatched position shown in FIG. 4. In addition, a compression spring 30 acts between the crossbar 15 and one end of the locking bolt 25 to urge the locking bolt to its locked position illustrated in FIG. 4. When the locking bolt is in its fully locked position, the operating handle 26 is located to the right (FIG. 4) of holes 31 (FIG. 5) formed in vertically spaced lugs 32 which project forwardly from the forward side of the crossbar 15. When the locking bolt 25 is fully locked, a pin 33 may be inserted into the holes 31 and engages the handle 26 to prevent the locking bolt from shifting to the left to its unlocked position. The pin 33 is tethered to the crossbar 15 by a chain 34 (FIG. 2).

When the trailer 11 is fully coupled to the truck 12, the free end portion of the locking bolt 25 is located behind the rear edge of the latch 20 as shown in FIG. 4 and prevents the latch from turning counterclockwise about the pivot 21 to its unlatched position. The kingpin 13 thus is captivated securely in the throat 18 to couple the trailer to the truck.

Uncoupling of the trailer 11 is effected by removing the pin 33 from the holes 31 in the lugs 32 and by then pulling the operating handle 26 to the left (FIG. 4) to shift the locking bolt 25 to its unlocked position shown in FIG. 5. When the bolt is in its unlocked position, its free end is clear of the latch 20 and thus the latch may pivot counterclockwise to its unlatched position. Such pivoting is effected when the truck 12 is driven forwardly and the rear edge of the notch 22 in the latch cams against the kingpin 13. Once the latch has been unlatched, the spring 29 holds the latch in its unlatched position so that the throat 18 may be moved into embracing relation with the kingpin 13 the next time the truck is backed toward the trailer to re-couple the trailer to the truck. During such backing, the kingpin 13 cams against the forward edge of the notch 22 in the latch 20 and causes the latch to pivot clockwise toward its latched position.

In accordance with the present invention, unique means are provided for holding the locking bolt 25 in its unlocked position once the bolt has been moved to that position to permit uncoupling of the trailer 11. As an incident to subsequent re-coupling of the trailer, the locking bolt 25 is automatically released for movement to its locked position so as to enable the bolt to hold the latch 20 securely in its latched position and thereby reduce the danger of the truck 12 being driven away without the trailer being coupled to the truck.

Herein, the aforementioned means comprise a detent link 40 (FIG. 4) having one end portion connected to the bar 28 to swing about an upright pivot 41. When the locking bolt is in its locked position (FIG. 4), the other end portion of the link projects through a slot 42 formed through one of the upright plates 43 of the crossbar 15. The nose 44 of the link engages the rear edge of the notch 22 in the latch 20 when the latch is fully latched as shown in FIG. 4. The nose is biased against the latch by a contractile spring 45 which is stretched between the bar 28 and the link 40 and which urges the link to swing clockwise about the pivot 41.

When the trailer 11 is fully coupled to the truck 12, the various parts of the hitch 10 are located in the positions shown in FIG. 4, the link 40 being in an inactive position. To uncouple the trailer, the driver pulls the operating handle 26 to the left (FIG. 4) to retract the locking bolt 25 from its locked position shown in FIG. 4 to its unlocked position shown in FIG. 5. As an incident thereto, the detent link 40 is pulled out of the notch 22 in the latch 20 and is pivoted clockwise about the pivot 41 by the spring 45. The detent link 40 comes to rest in the position shown in FIG. 5 in which the nose 44 of the link is disposed in the slot 42 and is located in engagement with an edge 50 of the latch 20. By virtue of such engagement, the link 40 prevents the bolt 25 from returning to the right to its locked position under the urging of the spring 30. As a result, the driver may return to the truck and the bolt 25 will remain in its unlocked position shown in FIG. 5 to permit unlatching of the latch 20.

Figure 6:
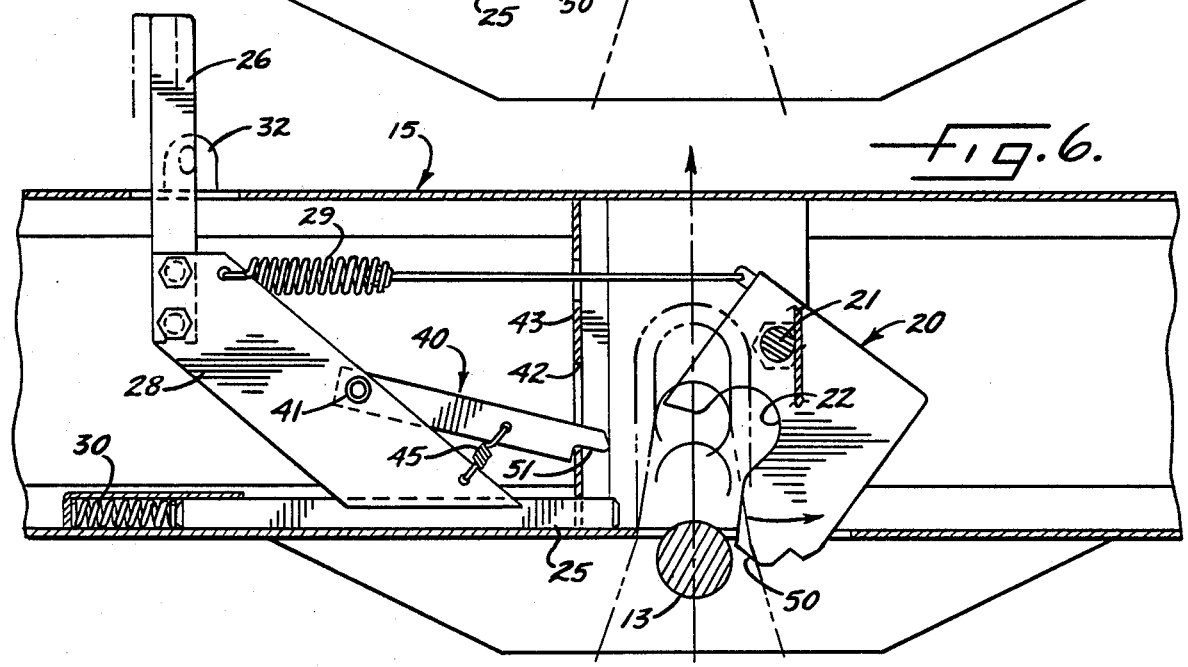
FIG. 6 is another view similar to FIG. 4 but shows the latch in its unlatched position and the trailer being uncoupled from the hitch.

When the truck 12 is pulled forwardly, the kingpin 13 causes the latch 20 to pivot counterclockwise to its unlatched position as shown in FIG. 6. During such pivoting, the edge surface 50 of the latch swings clear of the nose 44 of the link 40. As a result, the link is pushed to the right to an active position (FIG. 6) by the spring 30 until a detent surface 51 formed on the link near the nose 44 engages the wall 43 at the edge portion of the slot 42. Such engagement stops further rightward movement of the link and also prevents he bolt 25 from moving to the right to its locked position. The bolt thus stops in an intermediate position (FIG. 6) between its locked position (FIG. 4) and its unlocked position (FIG. 5). When the bolt 25 is in its intermediate position, the latch 20 is free to pivot between its latched and unlatched positions.

To re-couple the trailer 11 to the truck 12, the truck is backed toward the trailer and, during such movement, the kingpin 13 engages the forward edge of the notch 22 in the latch 20 to pivot the latch clockwise. As the latch pivots, an edge surface 52 of the latch engages the nose 44 of the link 40 and starts swinging the link counterclockwise about the pivot 41 (see FIG. 7) to cause the detent surface 51 to start leaving the edge portion of the slot 42. If the truck is backed sufficiently far to fully latch the latch 20, the latch returns the link to the position shown in FIG. 4. As soon as the detent surface 51 of the link 40 clears the edge of the slot 42, the spring 30 shifts the link and the bolt 25 to the right and, if the latch has been fully latched, the bolt will be shifted to the fully locked position shown in FIG. 4. The pin 33 then may be replaced in the holes 31 in the lugs 32 to hold the bolt in its locked position.

In some cases, the driver may not back the truck 12 toward the trailer 11 sufficiently far to fully latch the latch 20. Under such conditions, the locking bolt 25 will stop adjacent a latching surface in the form of a notch 53 in the edge of the latch as shown in FIG. 8 and will prevent the latch from returning to its unlatched position. When the brakes of the forwardly moving truck are first applied, the trailer will tend to overrun the truck, and the kingpin 13 will force the latch 20 to its fully latched position. When the latch is only partially latched, the handle 26 covers the holes 31 in the lugs 32 and prevents the pin 33 from being replaced. A prudent driver will, therefore, be visually warned that the latch is not fully latched and can take steps to correct that condition.

From the foregoing, it will be apparent that the present invention brings to the art a new and improved fifth wheel hitch 10 in which the detent link 40 acts to hold the locking bolt 25 in an unlocked position as long as the trailer 11 is uncoupled from the truck 12 and then automatically releases the bolt during recoupling in order to enable the bolt to return to its locked position. Thus, there is virtual assurance that the latch 20 will be latched when the truck is driven forwardly so as to reduce the danger of the trailer staying behind and causing the tailgate of the truck to be damaged by the kingpin 13.

I claim:

1. A hitch adapted, to be mounted in the bed of a pickup truck and interlocking with a kingpin of a fifth wheel trailer to couple the trailer to the truck, said hitch comprising a support adapted to be attached to the truck and having a rearwardly opening throat for receiving the kingpin, a latch mounted on said support to move between latched and unlatched positions, said latch captivating said kingpin in said throat when in said latched position and releasing said kingpin when in said unlatched position, a locking member mounted on said support to move between locked and unlocked positions, said locking member, when in said locked position holding said latch in said latched position and, when, in said unlocked position, to permitting said latch to move between said latched and unlatched positions, spring means for urging said latch toward said unlatched position and for urging said locking member toward said locked position, means connected to said locking member for manually moving said locking member toward said unlocked position, a detent moveably attached to said locking member and disposed in an inactive position when said locking member is in said locked position, said detent moving relative to said locking member toward an active position when said locking member is moved toward said unlocked position, said detent, when in said active position, preventing said spring means from returning said locking member to said locked position so said latch may pivot between said latched and unlatched positions when said detent is in said active position, and means on said latch for moving said detent from said active position toward said inactive position as said latch moves from said unlatched position toward said latched position whereby so said detent releases said locking member for movement toward said locked position so the locking member holds said latch in said latched position.

2. A hitch as defined in claim 1 in which said detent comprises a member having an end portion which engages a portion of said latch when said detent is in said inactive position and said latch is in said latched position, said end portion of said detent moving from said inactive position and toward said active position and engaging a different portion of said latch when said locking member is moved toward said unlocked position and before said latch moves to said unlatched position, and said detent releasing said latch and moving to said active position automatically as an incident to movement of said latch toward said unlatched position.

3. A hitch as defined in claim 2 in which said detent is mounted to pivot between said active and said inactive positions, and spring means urging said detent toward said active position.

4. A hitch as defined in claim 1 further including a latching surface on said latch and engageable with said locking member to hold said latch in an intermediate position between said latched and unlatched positions.

5. A hitch adapted to be mounted in the bed of a pickup truck and interlocking with a kingpin of a fifth wheel trailer to couple the trailer to the truck, said hitch comprising a support adapted to be attached to the truck and having a rearwardly opening throat for receiving the kingpin, a latch mounted on said support to pivot between a latched position and an unlatched position, said latch. Closing said throat and captivating said kingpin therein when in said latched position and opening said throat and releasing said kingpin when in said unlatched position, a locking bolt mounted on said support to reciprocate between locked and unlocked positions, said locking bolt, when in said locked position, holding said latch in said latched position and, when in said unlocked position, permitting said latch to pivot between said latched and unlatched positions, spring means for urging said latch to pivot toward said unlatched position and for urging said locking bolt to shift toward said locked position, means connected to said locking bolt for manually retracting said locking bolt toward said unlocked position, a detent movable with said locking bolt and disposed in an inactive position in engagement with said latch when said latch is in said latched position and said locking bolt is in said locked position, said detent being pivotally supported to move relative to said locking bolt toward an active position when said locking bolt is moved toward said unlocked position, said detent, when in said active position, preventing aid spring means from returning said locking bolt to said locked position said latch may pivot between said latched and unlatched positions when said detent is in said active position, means on said latch for moving said detent from said active position toward said inactive position as said latch moves from said unlatched position toward said latched position so said detent releases said locking bolt for movement toward said locked position so the locking bolt holds said latch in said latched position, and spring means urging said detent to pivot toward said active position.

6. A hitch as defined in claim 5 in which said detent comprises a member having an end portion which engages a portion of said latch when said detent is in said inactive position and said latch is in said latched position, said end portion of said detent moving from said inactive position and toward said active position and engaging a different portion of said latch when said locking bolt is shifted toward said unlocked position and before said latch pivots to said unlatched position, and said detent releasing said latch and moving to said active position automatically as an incident to movement of said latch toward said unlatched position.

7. A hitch adapted to be mounted in the bed of a pickup truck and interlocking with a kingpin of a fifth wheel trailer to couple the trailer to the truck, said hitch comprising a support member adapted to be attached to the truck and having a rearwardly opening throat for receiving the kingpin, a latch mounted on said support member to move between latched and unlatched position, said latch captivating said kingpin in said throat when in said latched position and releasing said kingpin when in said unlatched position, a locking member mounted on said support member to move between locked and unlocked positions, said locking member, when in said locked position, holding said latch in said latched position and, when in said unlocked position, permitting said latch to move between said latched and unlatched positions, spring means for urging said latch toward said unlatched position and for urging said locking member toward said locked position, means connected to said locking member for manually moving said locking member toward said unlocked position, a detent movably attached to one of said members and disposed in an inactive position when said locking member is in said locked position, said detent moving relative to said locking member toward an active position when said locking member is moved toward said unlocked position, said detent, when in said active position, preventing said spring means from returning said locking member to said locked position so said latch may pivot between said latched and unlatched positions when said detent is in said active position, and means for moving said detent from said active position toward said inactive position as said latch moves from said unlatched position toward said latched position so said detent releases said locking member for movement toward said locked position so the locking member holds said latch in said latched position.

* * * * *